(12) United States Patent
Takakuwa et al.

(10) Patent No.: US 12,022,165 B2
(45) Date of Patent: Jun. 25, 2024

(54) VIDEO DISTRIBUTION SYSTEM, INFORMATION PROCESSING METHOD, AND COMPUTER PROGRAM

(71) Applicant: GREE, INC., Tokyo (JP)

(72) Inventors: Soichiro Takakuwa, Tokyo (JP); Yuta Yanagisawa, Tokyo (JP); Aya Kurabuchi, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/098,498

(22) Filed: Jan. 18, 2023

(65) Prior Publication Data

US 2023/0156295 A1 May 18, 2023

Related U.S. Application Data

(63) Continuation of application No. 17/101,417, filed on Nov. 23, 2020, now Pat. No. 11,595,739.

(30) Foreign Application Priority Data

Nov. 29, 2019 (JP) .................................. 2019-215901
May 1, 2020 (JP) .................................. 2020-080981

(51) Int. Cl.
*H04N 21/81* (2011.01)
*G06F 3/14* (2006.01)
(Continued)

(52) U.S. Cl.
CPC ........... *H04N 21/8146* (2013.01); *G06F 3/14* (2013.01); *G06T 3/40* (2013.01); *G06T 7/70* (2017.01);
(Continued)

(58) Field of Classification Search
CPC ............. H04N 21/8146; H04N 21/234; H04N 21/2407; H04N 21/27; H04N 21/47202;
(Continued)

(56) References Cited

U.S. PATENT DOCUMENTS 9,239,949 B2  1/2016  Jung et al.
9,292,955 B1  3/2016  Haase et al.
(Continued)

FOREIGN PATENT DOCUMENTS

JP    2011-123779 A    6/2011
JP    2012-120098 A    6/2012
(Continued)

OTHER PUBLICATIONS

Sep. 26, 2023 Office Action issued in Japanese Patent Application No. 2022-038580.
(Continued)

*Primary Examiner* — Fernando Alcon
(74) *Attorney, Agent, or Firm* — Oliff PLC

(57) ABSTRACT

A video distribution system according to this disclosure is a video distribution system that distributes a video including an animation of a character object generated based on a movement of a distribution user and comprises one or a plurality of computer processors. The one or plurality of computer processors provide (i) a distribution portion, (ii) a display device, (iii) a determination portion. If the determination portion determines that a first object is being displayed within a predetermined distance from a second object, the object display device changes the first object and the second object to a third object and displays the third object.

12 Claims, 11 Drawing Sheets

(51) Int. Cl.
  *G06T 3/40* (2024.01)
  *G06T 7/70* (2017.01)
  *G06T 13/40* (2011.01)
  *G06T 13/80* (2011.01)
  *H04N 21/234* (2011.01)
  *H04N 21/24* (2011.01)

(52) U.S. Cl.
  CPC .............. *G06T 13/40* (2013.01); *G06T 13/80* (2013.01); *H04N 21/234* (2013.01); *H04N 21/2407* (2013.01); *G06T 2200/24* (2013.01); *G06T 2207/10016* (2013.01)

(58) Field of Classification Search
  CPC .. H04N 21/4756; H04N 21/4784; G06F 3/14; G06T 3/40; G06T 7/70; G06T 13/40; G06T 13/80; G06T 2200/24; G06T 2207/10016
  See application file for complete search history.

(56) References Cited

U.S. PATENT DOCUMENTS

| | | | |
|---|---|---|---|
| 10,504,264 B1 | 12/2019 | Koenig | |
| 2003/0214518 A1* | 11/2003 | Yamada | A63F 13/655 345/629 |
| 2005/0260547 A1 | 11/2005 | Moody | |
| 2009/0276802 A1* | 11/2009 | Amento | H04N 21/44012 345/473 |
| 2011/0304629 A1* | 12/2011 | Winchester | G06T 13/40 345/473 |
| 2013/0194280 A1* | 8/2013 | Kwon | G06T 15/00 345/473 |
| 2014/0039991 A1 | 2/2014 | Gates, III et al. | |
| 2015/0015504 A1 | 1/2015 | Lee et al. | |
| 2015/0269291 A1 | 9/2015 | Sekine et al. | |
| 2015/0334075 A1 | 11/2015 | Wang et al. | |
| 2016/0125635 A1* | 5/2016 | Nam | G06F 3/0481 715/764 |
| 2016/0286275 A1 | 9/2016 | Maeda et al. | |
| 2016/0357720 A1 | 12/2016 | Thimbleby | |
| 2017/0230321 A1 | 8/2017 | Bruns et al. | |
| 2018/0047200 A1* | 2/2018 | O'Hara | G06V 10/242 |
| 2018/0083901 A1 | 3/2018 | Mcgregor, Jr. et al. | |
| 2018/0295072 A1* | 10/2018 | Yim | G06F 3/04817 |
| 2018/0335928 A1 | 11/2018 | Van Os et al. | |
| 2019/0102889 A1 | 4/2019 | Azanza et al. | |
| 2019/0295056 A1* | 9/2019 | Wright | G06Q 30/0641 |
| 2019/0349636 A1 | 11/2019 | Watanabe et al. | |
| 2020/0034033 A1 | 1/2020 | Chaudhri et al. | |
| 2020/0213421 A1 | 7/2020 | Arakeri et al. | |
| 2021/0185392 A1* | 6/2021 | Xu | H04N 21/8146 |
| 2021/0225059 A1 | 7/2021 | Ramamurthy et al. | |
| 2021/0228985 A1* | 7/2021 | Matsushita | A63F 13/52 |
| 2021/0333960 A1 | 10/2021 | Beri et al. | |
| 2022/0319075 A1* | 10/2022 | Hu | H04L 51/10 |
| 2023/0009287 A1* | 1/2023 | Won | G06T 19/20 |
| 2023/0156295 A1 | 5/2023 | Takakuwa et al. | |
| 2023/0330541 A1* | 10/2023 | Dong | A63F 13/47 |

FOREIGN PATENT DOCUMENTS

| | | |
|---|---|---|
| JP | 2015-184689 A | 10/2015 |
| JP | 2016-200853 A | 12/2016 |
| JP | 2019/205176 A | 11/2019 |
| WO | 2018/142494 A1 | 8/2018 |
| WO | 2019/216249 A1 | 11/2019 |
| WO | WO-2019216249 A1 * | 11/2019 |

OTHER PUBLICATIONS

Aug. 29, 2023 Office Action issued in Japanese Patent Application No. 2022-040866.

Liver School [online], Jan. 13, 2021, [searched on Aug. 2, 2021], Internet <URL:https://liver-school.com/freee-gift/>.

Nov. 7, 2023 Office Action issued in Japanese Patent Application No. 2022-040866.

* cited by examiner

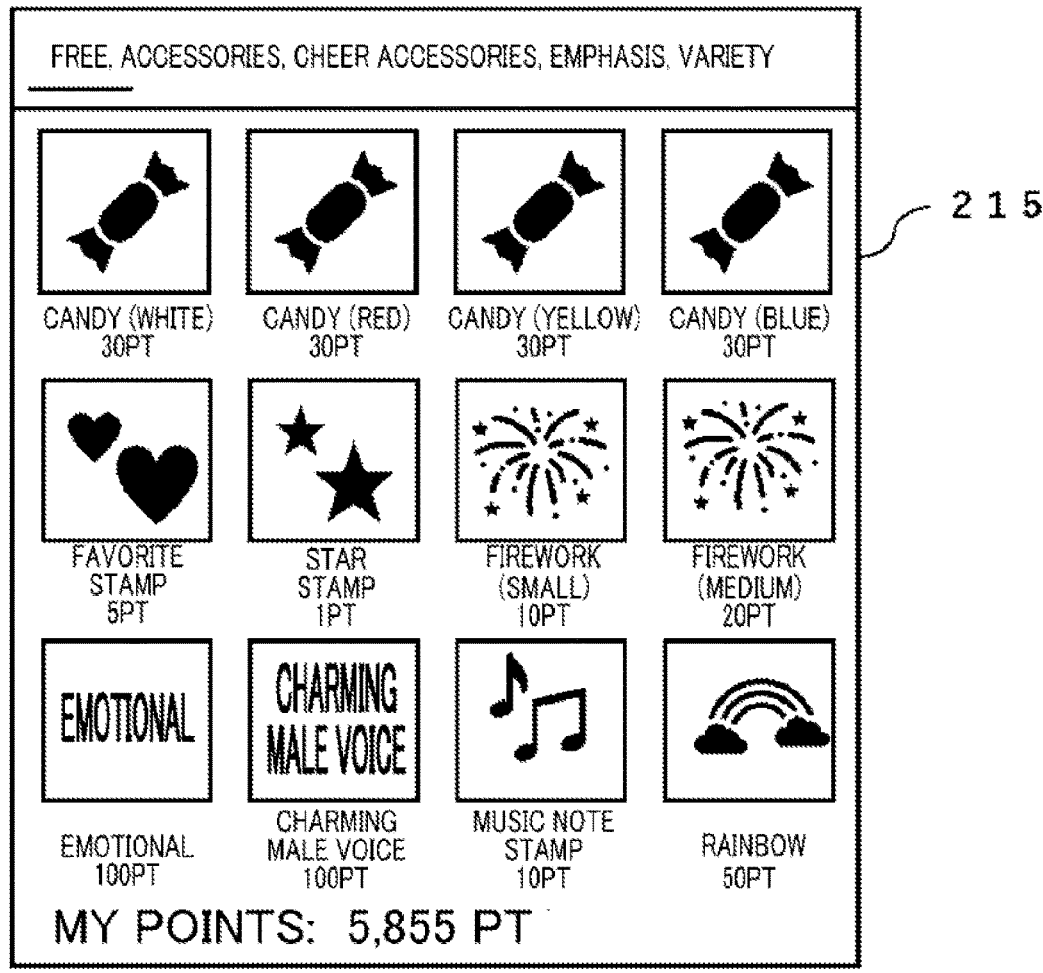
FIG. 7
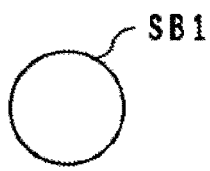 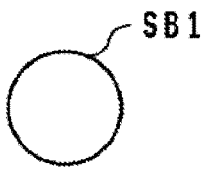  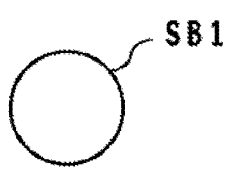
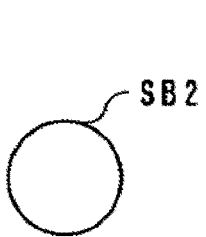 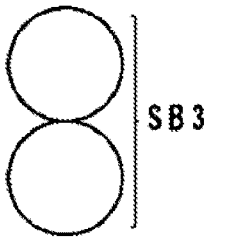 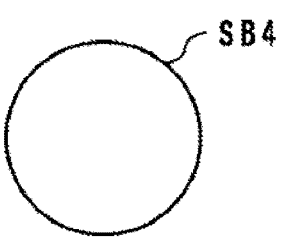
FIG. 8A     FIG. 8B     FIG. 8C     FIG. 8D

VIDEO DISTRIBUTION SYSTEM, INFORMATION PROCESSING METHOD, AND COMPUTER PROGRAM

This application is a continuation of U.S. application Ser. No. 17/101,417 filed Nov. 23, 2020, which is based on and claims the benefit of priority from Japanese Patent Application No. 2019-215901 filed Nov. 29, 2019, and Japanese Patent Application No. 2020-080981 filed May 1, 2020, the entire contents of the prior applications being incorporated herein by reference.

TECHNICAL FIELD

This disclosure relates to a video distribution system, an information processing method, and a computer program.

BACKGROUND TECHNOLOGY

Conventionally, a video distribution system is known which generates an animation of a character object based on a movement of an actor and distributes a video including the animation of the character object (see, for example, Patent Document 1).

In this type of video distribution system, it is proposed, by an operation of a viewing user, to display an arbitrary object on the video. The object displayed on the video by the viewing user is, for example, a gift object or the like.

PRIOR ART REFERENCE

[Patent Reference]
  [Patent Document 1] JP2015-184689A

SUMMARY

Problem to be Resolved

Usually, after the gift selected by the operation of the viewing user falls as a gift object from an upper part to a lower part of a space within the video and is placed at a predetermined position, it is generally displayed in such a manner that the display is finished with the passing of time.

Here, because the viewing user's gifting leads to an improvement in a distribution user's motivation to distribute, a problem in this technical field is how to improve a motivation of the viewing user for gifting.

Therefore, an object of this disclosure is to provide a technical improvement that solves or alleviates at least part of the above-described problem of the conventional technology. One of the more specific objects of this disclosure is to provide a video distribution system, an information processing method, and a computer program that can improve a motivation of a viewing user for gifting.

Means of Solving Problem

A video distribution system according to this disclosure is a video distribution system that distributes a video including an animation of a character object generated based on a movement of a distribution user, and comprises one or a plurality of computer processors. The one or plurality of computer processors provide (i) a distribution portion that distributes, to a viewing user terminal, information about a video including the animation of the character object of the distribution user, (ii) an object display device that displays a first object corresponding to a first gift on the video based on a display request for the first gift transmitted from the viewing user terminal, and (iii) a determination portion that determines whether the first object displayed by the object display device is being displayed within a predetermined distance from a second object already displayed on the video. If the determination portion determines that the first object is being displayed within the predetermined distance from the second object, the object display device changes the first object and the second object to a third object and displays the third object.

The object display device may restrict the display of the first object based on a further display request for the first gift while the third object is being displayed.

The one or plurality of computer processors may restrict acceptance of a further display request for the first gift while the third object is being displayed.

When a plurality of first objects are displayed by the object display device, the one or plurality of computer processors may further comprise (i) a measurement portion that, in connection with the plurality of first objects, measures the number of times it is determined that the objects are being displayed within a predetermined distance from one or a plurality of second objects already displayed on the video and (ii) a number-of-times determination portion that determines whether the number of times measured by the measurement portion has reached a predetermined number. When the number-of-times determination portion determines that the number of times has reached the predetermined number, the object display device can change the first objects and the second objects to a third object and display the third object.

The object display device can display at least part of the third object so as to cover a head of the character object and follow the movement of the head of the character object.

The one or plurality of computer processors can change the predetermined number of times, based on a screen size of the video.

When the number-of-times determination portion determines that the number of times has not reached the predetermined number of times, the object display device can display the first object in contact with the second object.

The object display device can display the first object, based on designation of an initial display position of the first object transmitted from the viewing user terminal.

The object display device can display the third object so as to be attached to a predetermined portion of the character object.

The object display device can display the third object so as to be arranged in a space within the video.

An information processing method according to this disclosure is an information processing method in a video distribution system that distributes a video including an animation of a character object generated based on a movement of a distribution user and causes one or a plurality of computer processors included in the video distribution system to execute (i) a distributing step that distributes, to a viewing user terminal, information about a video including the animation of the character object of the distribution user, (ii) an object display step that displays a first object corresponding to a first gift on the video based on a display request for the first gift transmitted from the viewing user terminal, and (iii) a determining step that determines whether the first object displayed in the object display step is being displayed within a predetermined distance from the second object already displayed on the video. If the determining step determines that the first object is being displayed within a predetermined distance from the second object, the first object and the second object are changed to a third object, and then the third object is displayed.

A computer program according to this disclosure is a computer program executed by a distribution user terminal that includes a video distribution system that distributes a video including an animation of a character object generated based on a movement of a distribution user. The video distribution system includes the distribution user terminal, a viewing user terminal, and a server device and causes one or a plurality of computer processors included in the distribution user terminal to realize (i) a transmission function that transmits, to the server device, information about the video including the animation of the character object of the distribution user, (ii) a reception function that receives, from the server device, a display request, by the viewing user terminal, for a first gift to be displayed on the video, (iii) an object display function that displays a first object corresponding to the first gift on the video, based on the display request received by the reception function, and (iv) a determination function that determines whether the first object displayed by the object display function is being displayed within a predetermined distance from a second object already displayed on the video. If the determination function determines that the first object is displayed within the predetermined distance from the second object, the object display function changes the first object and the second object to a third object and displays the third object.

An information processing method according to this disclosure is an information processing method in a distribution user terminal that includes a video distribution system that distributes a video including an animation of a character object generated based on a movement of a distribution user. The video distribution system includes the distribution user terminal, a viewing user terminal, and a server device and causes one or a plurality of computer processors included in the distribution user terminal to execute (i) a transmitting step that transmits, to the server device, information about the video including the animation of the character object of the distribution user, (ii) a receiving step that receives, from the server device, a display request, by the viewing user terminal, for a first gift to be displayed on the video, (iii) an object display step that displays a first object corresponding to the first gift on the video, based on the display request received by the receiving step, and (iv) a determining step that determines whether the first object displayed in the object display step is being displayed within a predetermined distance from a second object already displayed on the video. If the determining step determines that the first object is displayed within the predetermined distance from the second object, in the object display step, the first object and the second object are changed to a third object, and then the third object is displayed.

A computer program according to this disclosure is a computer program executed by a viewing user terminal that includes a video distribution system that distributes a video including an animation of a character object generated based on a movement of a distribution user. The video distribution system includes a distribution user terminal, the viewing user terminal, and a server device and causes one or a plurality of computer processors included in the viewing user terminal to realize (i) a reception function that receives, from the server device, information about the video including the animation of the character object of the distribution user, (ii) a display function that displays the video, based on the information about the video, and (iii) a transmission function that transmits, to the server device, a display request for a first gift to be displayed on the video. As a result of determining whether a first object displayed on the video based on the display request is being displayed within a predetermined distance from a second object already displayed on the video, if it is determined that the first object is being displayed within a predetermined distance from the second object, the display function changes the first object and the second object to a third object and displays the third object.

An information processing method according to this disclosure is an information processing method in a viewing user terminal that includes a video distribution system that distributes a video including an animation of a character object generated based on a movement of a distribution user. The video distribution system includes a distribution user terminal, the viewing user terminal, and a server device and causes one or a plurality of computer processors included in the viewing user terminal to execute (i) a receiving step that receives, from the server device, information about the video including the animation of the character object of the distribution user, (ii) a display step that displays the video, based on the information about the video, and (iii) a transmitting step that transmits, to the server device, a display request for a first gift to be displayed on the video. As a result of determining whether a first object displayed on the video based on the display request is being displayed within a predetermined distance from a second object already displayed on the video, if it is determined that the first object is being displayed within a predetermined distance from the second object, in the display step, the first object and the second object are changed to a third object, and then the third object is displayed.

Effects

According to this disclosure, a technical improvement can be provided that solves or alleviates at least part of a problem of the above-described conventional technology. Specifically, according to a mode of this disclosure, a video distribution system, an information processing method, and a computer program can be provided that can improve a motivation of the viewing user for gifting.

BRIEF DESCRIPTION OF DRAWINGS

FIG. 7 is a conceptual diagram showing an image of a screen of a list of gifts displayed on the viewing user terminal.

FIGS. 8A to 8D are conceptual diagrams showing images of gift objects displayed on a video.

MODE TO IMPLEMENT EMBODIMENTS

First, with reference to the drawings, an outline of a video distribution system according to a mode of this disclosure will be explained.

A video distribution system according to this disclosure is a video distribution system that distributes a video including an animation of a character object generated based on a movement of a distribution user, and comprises one or a plurality of computer processors.

<System Configuration>

Figure 1:
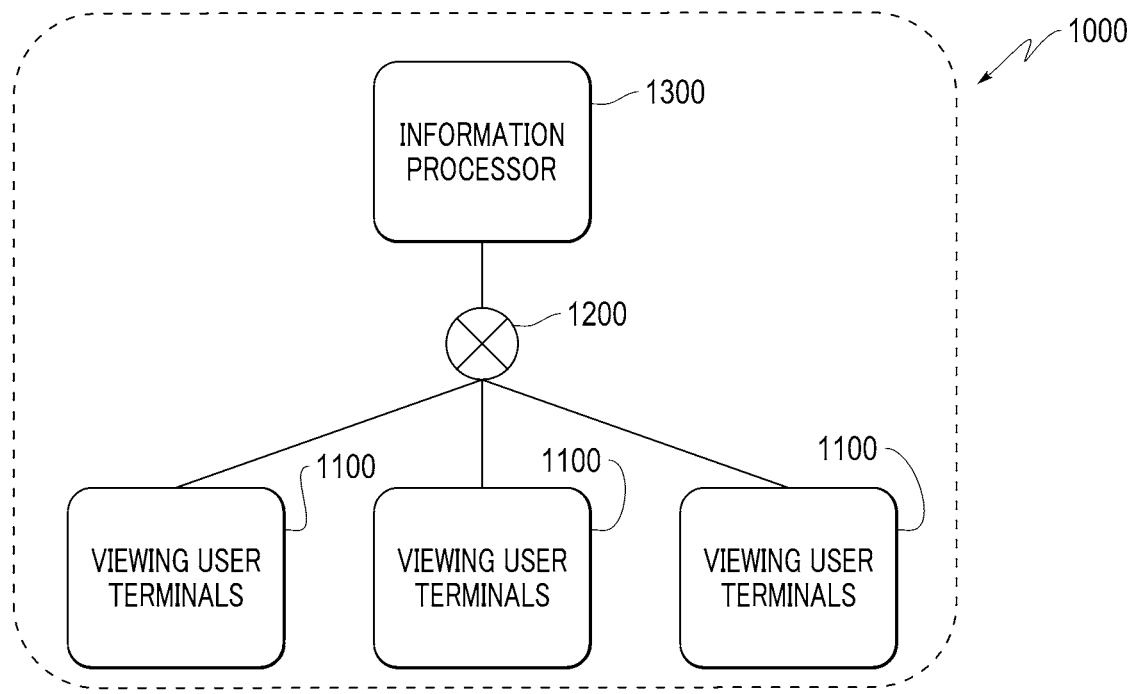
FIG. 1 is a system configuration diagram showing an example of a video distribution system according to this disclosure.

As shown as an example in FIG. 1, a video distribution system 1000 according to this disclosure includes (i) one or a plurality of viewing user terminals 1100, and (ii) an information processor (support computer) 1300, which is connected to these viewing user terminals 1100 via a network 1200 and is arranged in a video distribution studio or the like.

Furthermore, the information processor 1300 may be connected to a server device 1400 (not depicted) via the Internet, and some or all of later-described processing to be performed by the information processor 1300 may be performed on the server device 1400. Additionally, such a server device 1400 may be an information processor 400 shown in FIG. 2.

In this specification, distribution by the video distribution system 1000 will be referred to as studio distribution.

In studio distribution, whole body movement of a distribution user (actor) is reflected on a character in real time by capturing a marker(s) attached to the distribution user with a camera installed in the studio using known motion capture technology.

Figure 2:
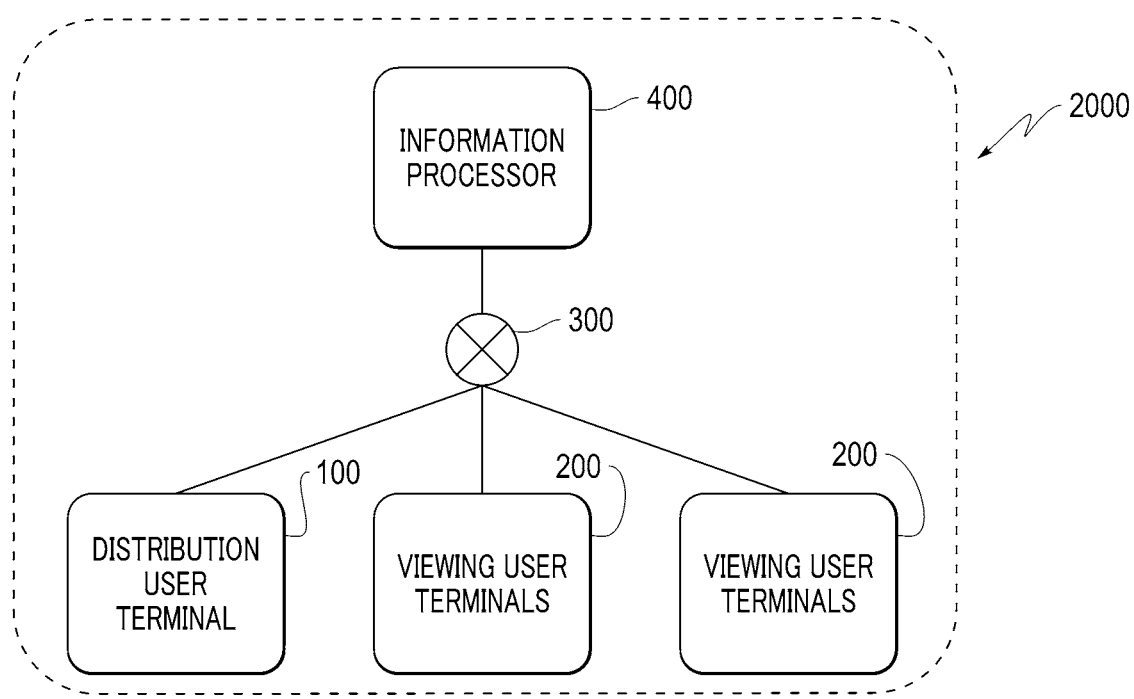
FIG. 2 is a system configuration diagram showing an example of a video distribution system according to this disclosure.

Additionally, the video distribution system 1000 of this disclosure may work with another video distribution system 2000 shown as an example in FIG. 2. The video distribution system 2000 shown in FIG. 2 may include a distribution user terminal 100, one or a plurality of viewing user terminals 200, and the information processor (server device) 400 connected to the distribution user terminal 100 and the viewing user terminals 200 via a network 300.

In the above example, the distribution user terminal 100 may be an information processing terminal such as a smartphone. In this specification, such distribution by a video distribution system 2000 will be referred to as "mobile distribution."

In mobile distribution, a face of the distribution user is captured by a camera of the distribution user terminal 100, and movement of the face of the distribution user will be reflected on a face of a character in real time using known face tracking technology.

As an example, a video generated by the video distribution system 1000 and the video distribution system 2000 may be distributed to the viewing user from one video distribution platform.

Further, there is no particular distinction between the distribution user and the viewing user in mobile distribution. A viewing user can perform mobile distribution at any time, and a distribution user can be a viewing user when viewing a video of another distribution user.

Also, in any distribution, a process of generating an animation by reflecting a motion on the character and a later-described process of displaying a gift may be shared by the distribution user terminal, the viewing user terminals, the information processor, and another device.

Specifically, in the terminal or device that generates an animation of a character object, face motion data and voice data of the distribution user are transmitted from the distribution user terminal. Also, in addition to face motion, body motion may be transmitted.

In the following description, the process of generating an animation is respectively performed by the distribution user terminal and the viewing user terminals, but the process is not limited to this.

In the following description, a video distribution system according to this disclosure comprises a system configuration (mobile distribution) shown in FIG. 2. However, the system configuration shown in FIG. 1 may also be provided.

<Hardware Configuration>

Figure 3:
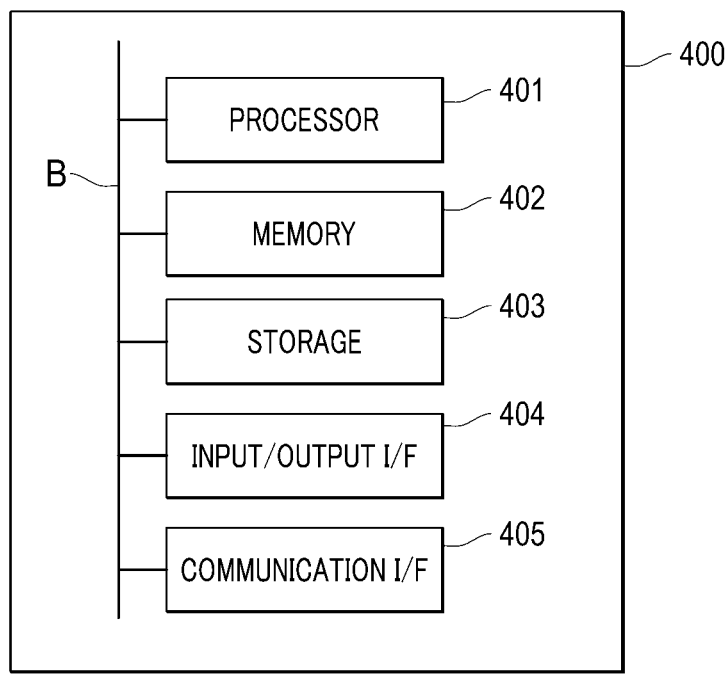
FIG. 3 is a configuration diagram showing an example of a hardware configuration of an information processor according to this disclosure.

Here, with reference to FIG. 3, a hardware configuration of the information processor 400 included in the video distribution system 2000 will be described. The information processor 400 includes a processor 401, a memory 402, a storage 403, an input/output interface (input/output I/F) 404, and a communication interface (communication I/F) 405. Each component is mutually connected via a bus B.

The information processor 400 can realize functions and methods described in this mode by the processor 401, the memory 402, the storage 403, the input/output I/F 404, and the communication I/F 405 working together.

The processor 401 executes a function and/or a method implemented by a code or a command included in a program stored in the storage 403. The processor 401 may include, for example, a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array) or the like, and may realize each process disclosed in each mode by a logic circuit (hardware) or a dedicated circuit formed in an integrated circuit (IC (Integrated Circuit) chip, LSI (Large Scale Integration)) or the like. In addition, these circuits may be realized by one or a plurality of integrated circuits. A plurality of processes shown in each mode may be realized by one integrated circuit. Also, depending on the degree of integration, the LSI is sometimes called a VLSI, a super LSI, an ultra LSI, or the like.

The memory 402 temporarily stores a program loaded from the storage 403 and provides a work area for the processor 401. In the memory 402, the processor 401 also temporarily stores various data generated while executing the program. The memory 402 includes, for example, a RAM (Random Access Memory), a ROM (Read Only Memory), or the like.

The storage 403 stores a program. The storage 403 includes, for example, an HDD (Hard Disk Drive), an SSD (Solid State Drive), a flash memory, or the like.

The communication I/F 405 is installed as hardware such as a network adapter, software for communication, and a combination thereof, and sends and receives various data via the network 300. The communication may be wired or wireless, and any communication protocol may be used as long as communication can be performed. The communication I/F 405 performs communication with another information processor via the network 300. The communication I/F 405 transmits various data to the other information processor according to an instruction from the processor 401. Also, the communication I/F 405 receives various data transmitted from the other information processor and transmits the data to the processor 401.

The input/output I/F 404 includes an input device that inputs various operations to the information processor 400, and an output device that outputs a processing result processed by the information processor 400. In the input/output I/F 404, the input device and the output device may be integrated, or the input device and the output device may be separated from each other.

The input device is realized by any of all types of devices that can receive an input from a user and transmit information related to the input to the processor 401, or a combination thereof. The input device includes, for example, (i) a hardware key such as a touch panel, a touch display, or a keyboard, (ii) a pointing device such as a mouse, (iii) a camera (an operation input via an image), or (iv) a microphone (an operation input by voice).

The output device outputs the processing result processed by the processor 401. The output device includes, for example, a touch panel, a speaker, or the like. Furthermore, the information processor 1300, the information processor 400, the viewing user terminals 1100, the distribution user terminal 100, and the viewing user terminals 200 may be configured with a hardware configuration similar to that of FIG. 3, except in special cases.

<Functional Configuration>

Figure 4:
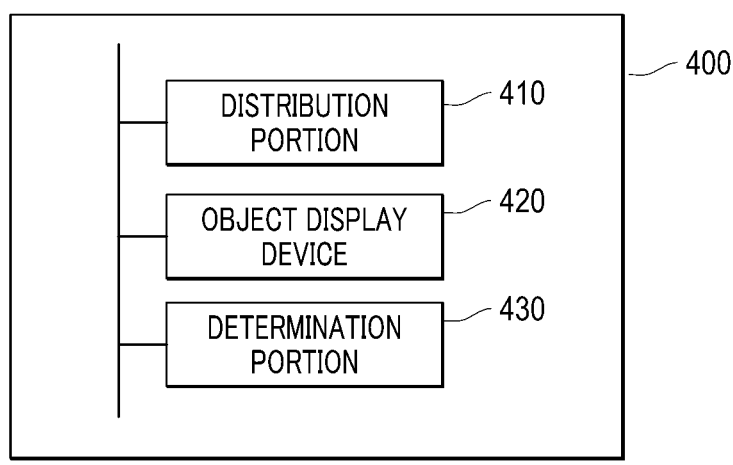
FIG. 4 is a configuration diagram showing an example of a functional configuration of an information processor according to this disclosure.

Additionally, as shown in FIG. 4, the above-mentioned one or plurality of computer processors (the information processor 400 in this example) includes a distribution portion 410, an object display device 420, and a determination portion 430.

The distribution portion 410 distributes information about the video including the animation of the character object of the distribution user to the viewing user terminals 1100. The information about the video including the animation of the character object of the distribution user includes, for example, motion information showing motion of the character object, voice information of the distribution user, gift object information showing a gift sent from another viewing user, and the like. Furthermore, the gift object information includes at least (i) gift object identification information that specifies the type of gift object and (ii) position information that shows the position at which the gift object is displayed.

As an example, the distribution portion 410 can perform live distribution of a video via the above-described video distribution platform.

Figure 5:
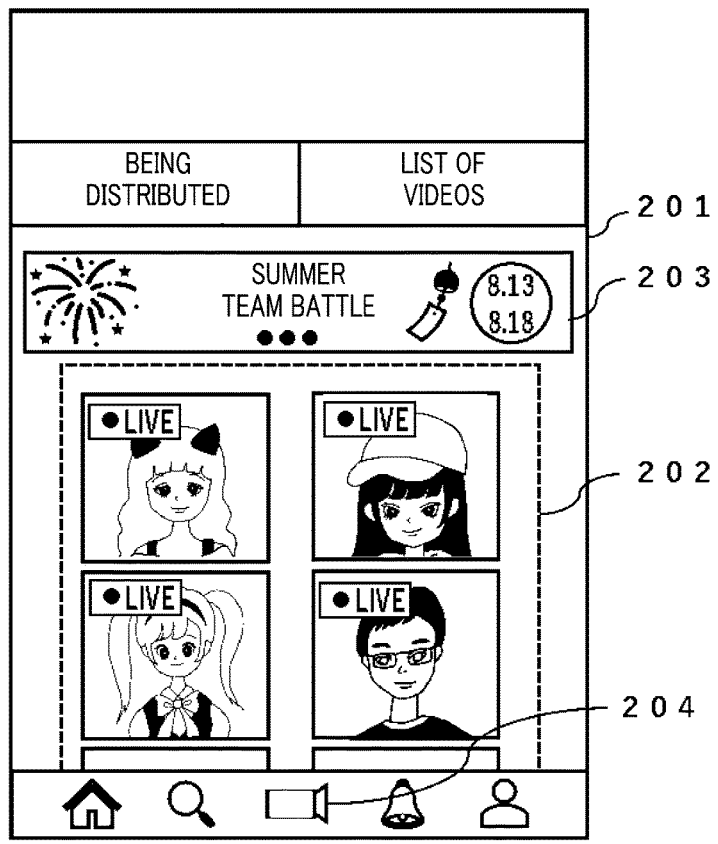
FIG. 5 is a conceptual diagram showing an image of a top screen displayed on a viewing/distribution user terminal.

FIG. 5 shows a top screen 201 displayed on the viewing user terminal 200 of a viewing user who has accessed the above-described video distribution platform.

As shown in FIG. 5, by selecting one distribution channel from the one or plurality of distribution channels 202 displayed in a list on the top screen 201, the viewing user can view the video reproduced on the one distribution channel.

Alternatively, the viewing user can view the video reproduced on the one specified distribution channel by accessing the fixed link of the one specified distribution channel. Such a fixed link can be obtained from a notification from a distribution user who is currently following, a share notification sent from another user, or the like.

As shown in FIG. 5, a display field 203 for notification of a promotion, an event, or the like may be displayed on the top screen 201. This display field 203 for notification may be switched to a display for another notification by a slide operation.

In addition, in the above-described video distribution platform, a list of distribution channels being distributed and a list of distribution channels scheduled to be distributed may be separately displayed by tabs (being distributed/a list of videos). As an example, FIG. 5 shows a list of distribution channels being distributed.

Also, the viewing user can view the video by selecting one distribution channel on the top screen 201. By selecting a distribution button 204, the viewing user can become a distribution user who distributes the video by himself.

Figure 6:
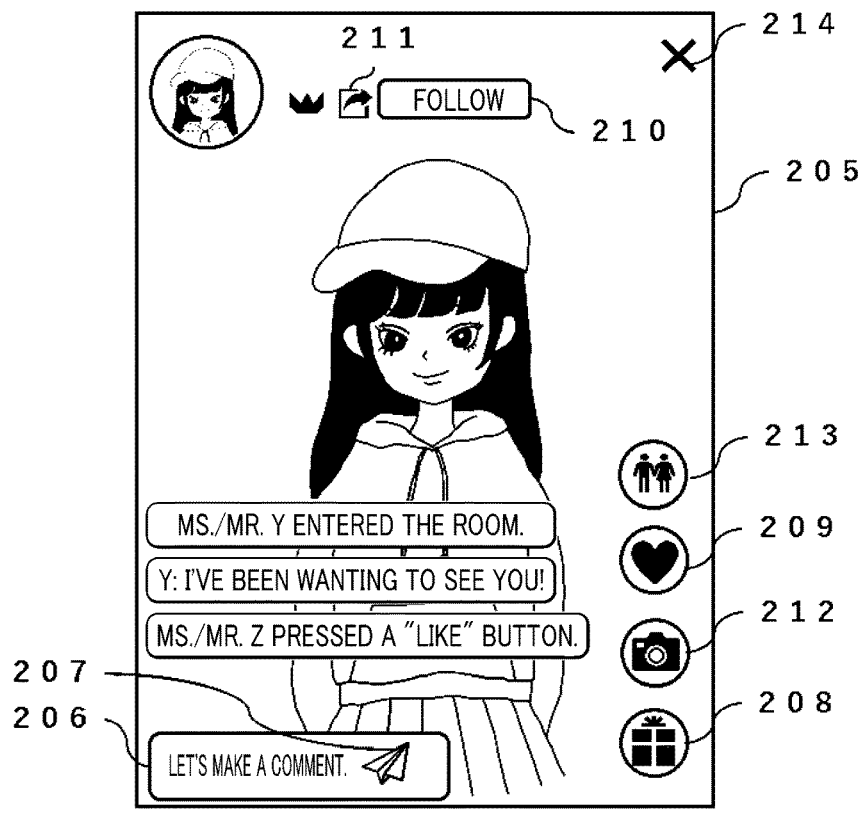
FIG. 6 is a conceptual diagram showing an image of a distribution screen displayed on a viewing user terminal.

FIG. 6 is an example showing a screen 205 of a distribution video displayed on the terminal of the viewing user. The viewing user can post a comment by inputting text in a comment posting field 206 and pressing a send button 207. Also, by pressing a gift button 208, a gift list is displayed to the viewing user, and a gift designated by selection can be posted. In addition, the viewing user can post an evaluation showing favor by pressing a like button 209. Pressing a button includes selecting a button displayed on the screen by tapping or the like.

A "follow" button 210 for the viewing user to follow the distribution user is displayed on the screen of a video distributed by a distribution user that the viewing user has not yet followed. This "follow" button 210 functions as a follow cancel button on the screen of a video distributed by a distribution user who the viewing user has already followed.

This "follow" may be performed from one viewing user to another viewing user, from one distribution user to one viewing user, and from one distribution user to another distribution user. However, "follow" is managed as an association in only one direction, and association in the opposite direction is separately managed as a follower.

Further, regarding the sharing of the video, the viewing user can confirm a list of SNSs that can be shared by pressing a share button 211, and can transmit a fixed link to a designated location of an SNS designated by selection.

Additionally, regarding a still image, the viewing user can save the still image of the screen by pressing a screenshot button 212. Also, by pressing a screen shot button 212, a list of SNSs that can share still images is displayed, and the viewing user can transmit the still images to a designated location of an SNS designated by selection.

Further, by pressing a collaboration button 213, collaborative distribution can be requested to the distribution user. Collaborative distribution means that the character object of the viewing user is made to appear in the distribution video of the distribution user.

Additionally, a viewing end request can be transmitted by pressing a viewing end button 214 shown in FIG. 6.

Then, the object display device 420 displays on the video a first object corresponding to a first gift, based on a display request for the first gift transmitted from the viewing user terminal 200.

The first gift is, for example, selected by the viewing user from a list of gifts displayed on the viewing user terminal 210 by pressing the gift button 208, and a display request is made.

FIG. 7 shows an example of a screen 215 showing a list of gifts displayed on the viewing user terminal 210. As shown in FIG. 7, the gifts may be separated and displayed according to classification (such as free gifts, paid gifts, accessories, cheer accessories, emphasis, and variety).

Here, paid gifts are gifts that can be purchased by spending self-coins purchased by the viewing user, and free gifts are gifts that can be acquired by spending self-points that the viewing user has acquired for free, or without consuming any self-points.

As an example, the first gift is a snowball gift for displaying a snowball object SB1 representing a snowball as shown in FIG. 8A.

Figures 9A, 9B, 9C, 9D:
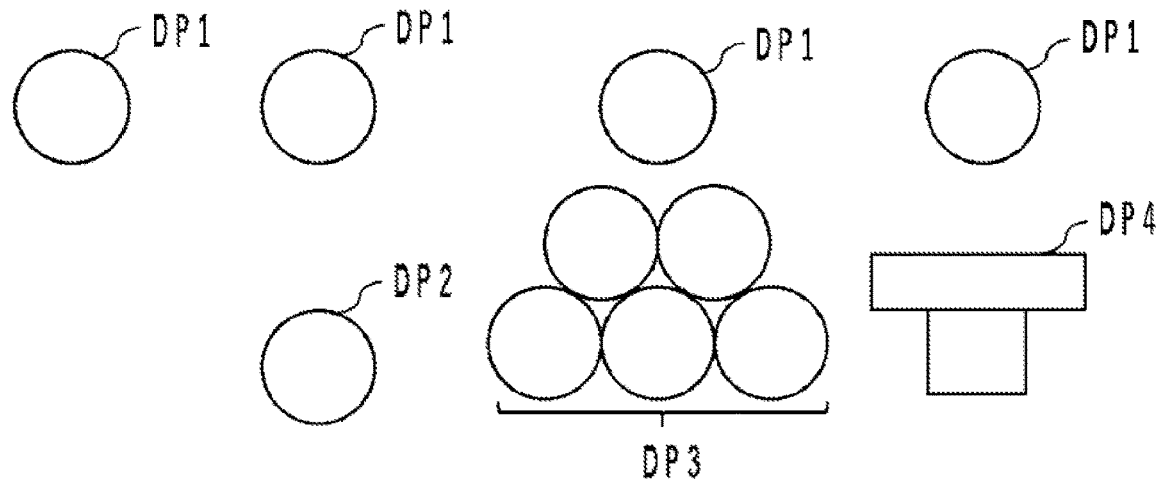
FIGS. 9A to 9D are conceptual diagrams showing images of gift objects displayed on a video.

Additionally, as another example, the first gift is a dumpling gift for displaying a dumpling object DP1 expressing a dumpling, as shown in FIG. 9A.

The first gift and the first object are not limited to the above examples. The object may be any shape as long as it can display a third object in relation to a second object described later.

The determination portion 430 determines whether the first object displayed by the object display device 420 is being displayed within a predetermined distance from a second object already displayed on the video.

As an example, the second object can be a snowball object SB2 that is the same as the first object, as shown in FIG. 8B. That is, the first object already displayed on the video becomes the second object.

Also, as shown in FIG. 8C, the second object may be an object SB3 in which a plurality of snowballs, which are the first objects, are stacked. Alternatively, as shown in FIG. 8D, the second object may be a snowball object SB4 that is larger than the snowball object that is the first object.

Each of these second objects may be displayed in response to a request to display the first gift. That is, as shown in FIG. 8D, when there is a first request to display the first gift in one video, the large snowball object SB4 is displayed. For the second time and after, the snowball object SB1 smaller than the object corresponding to the first request for the first gift may be displayed.

As another example, the second object can be the same dumpling object DP2 as the first object, as shown in FIG. 9B. That is, the first object already displayed on the video becomes the second object.

Further, as shown in FIG. 9C, the second object may be an object DP3 in which the dumpling objects which are the first objects are aligned or stacked. Alternatively, as shown in FIG. 9D, the second object may be a pedestal object DP4 for stacking a dumpling object which is the first object.

Also, any of these second objects may be displayed by the display request for the first gift. That is, as shown in FIG. 9D, when there is a first request to display the first gift in one video, the pedestal object DP4 is displayed, and at the second time and after, a dumpling object DP1 may be displayed that is different from the object corresponding to the request for the first gift. Also, a configuration may be such that (i) when there is a second request to display the first gift, an object is displayed in which three dumplings are aligned, (ii) when there is a third request to display the first gift, an object is displayed in which two dumplings are aligned, and (iii) when there is a fourth request for displaying the first gift, one dumpling object is displayed. Additionally, the number of dumplings is not particularly limited to the above examples.

Information about the first object includes at least (i) identification information that identifies the type of the first object and (ii) position information that shows a position at which the object is displayed. The first object is displayed at a predetermined position with the predetermined type of shape, based on the information about the first object. Whether the first object is being displayed within a predetermined distance from the second object already displayed on the video is determined by comparing (i) three-dimensional or two-dimensional coordinates of a position at which the second object is displayed and (ii) three-dimensional or two-dimensional coordinates of a position at which the first object is displayed.

Furthermore, the predetermined distance is not particularly limited, but it is preferable that the predetermined distance is set considering ease of viewing by the viewing user or the distribution user. As an example, the predetermined distance can be set based on the screen size of the video and the size of the object.

The first object may be displayed in a mode of moving from the upper part of the screen to the lower part. It may also be displayed in a mode of moving from the lower part to the upper part, from the left part to the right part, from the right part to the left part, from the back of the screen to the front, or from the front of the screen to the back.

When the determination portion 430 determines that the first object is displayed within the predetermined distance from the second object, the object display device 420 changes the first object and the second object to a third object and displays the third object.

Figure 10:
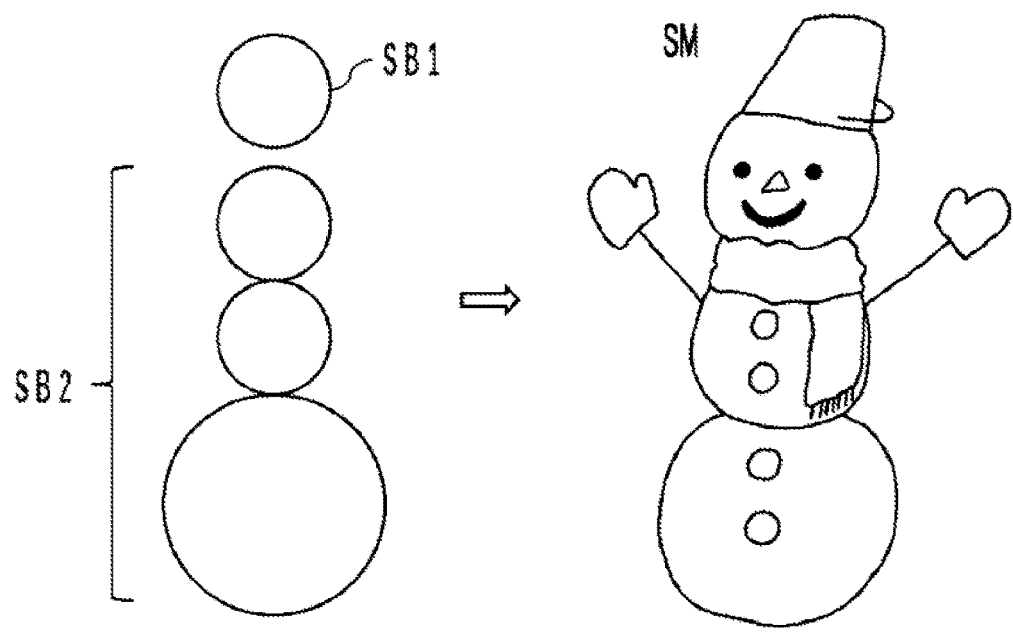
FIG. 10 is a conceptual diagram showing an image of a gift object displayed on a video.

As an example, when the first object is the snowball object SB1, the third object can be a snowman object SM as shown in FIG. 10.

Figure 11:
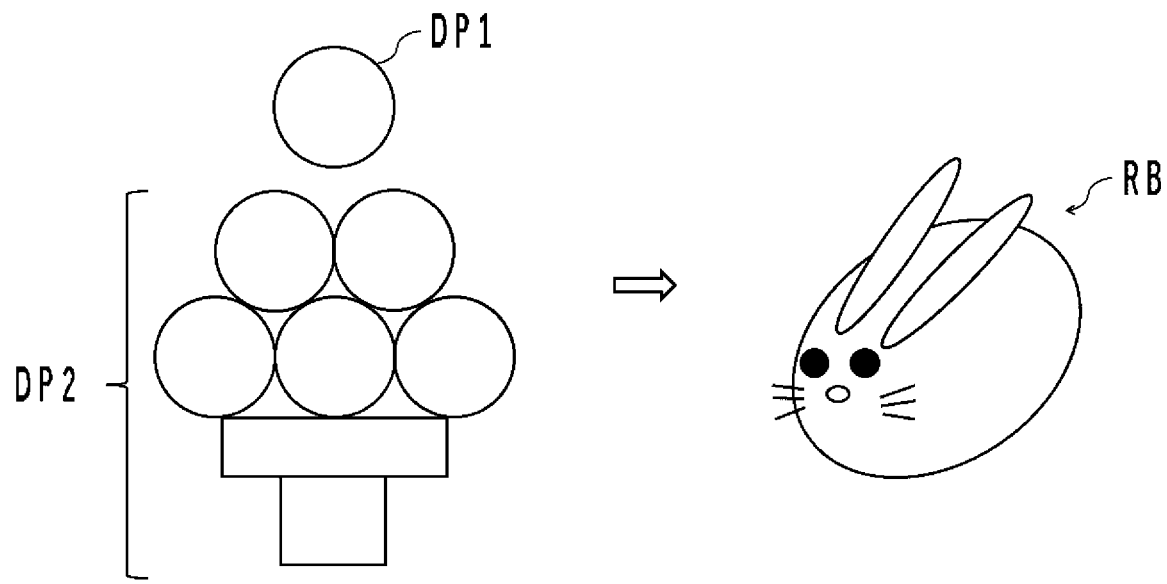
FIG. 11 is a conceptual diagram showing an image of a gift object displayed on a video.

Alternatively, when the first object is the dumpling object DP1, the third object can be a rabbit object RB as shown in FIG. 11.

When the determination portion 430 determines that the first object is not displayed within the predetermined distance from the second object, the object display device 420 does not change the first object and the second object to the third object. In the same manner as with a normal gift object, the first object is displayed at a predetermined position on the screen without changing a display mode until a predetermined time elapses.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Figure 12:
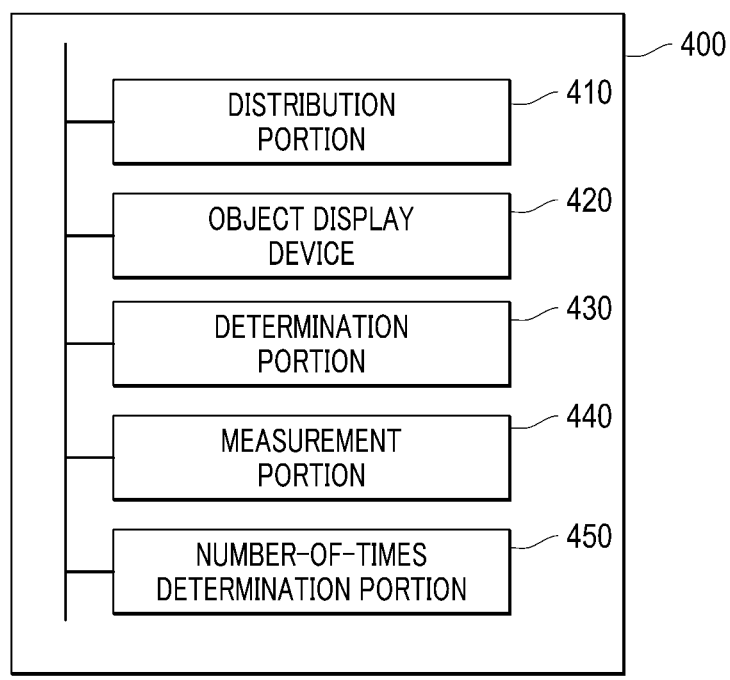
FIG. 12 is a configuration diagram showing another example of the functional configuration of an information processor according to this disclosure.

In addition, as shown in FIG. 12, one or a plurality of computer processors according to this disclosure may further include a measurement portion 440 and a number-of-times determination portion 450.

When a plurality of first objects are displayed by the object display device 420, the measurement portion 440 measures the number of times that it has been determined that the plurality of first objects are displayed within the predetermined distance from one or a plurality of second objects already displayed the video.

The number-of-times determination portion 450 determines whether the number of times measured by the measurement portion 440 has reached a predetermined number.

At this time, it is preferable that the predetermined number of times is set based on the screen size of the video. That is, it is preferable that the defined number of times be different depending on whether the screen size of the displayed video is vertically long or horizontally long. As an example, when the screen size is vertically long, the defined number of times is three, whereas when the screen size is horizontally long, the defined number of times is two.

Then, when the number-of-times determination portion 450 determines that the number of times has reached the predetermined number of times, the object display device 420 can change the first object and the second object to a third object and display the third object.

When the number-of-times determination portion 450 determines that the number of times has not reached the predetermined number of times, and before the number-of-times determination portion 450 determines that the number of times has reached the predetermined number, the object display device 420 can display the first object in contact with the second object.

A position at which the first object contacts the second object is not particularly limited. However, as an example, as shown in FIGS. 8A to 8D and 9A to 9D, the first object can be displayed in contact with the second object in such a manner that they are stacked on top of each other.

Here, an example in which the predetermined number of times is three will be specifically explained with reference to FIGS. 13 and 14.

Figure 13:
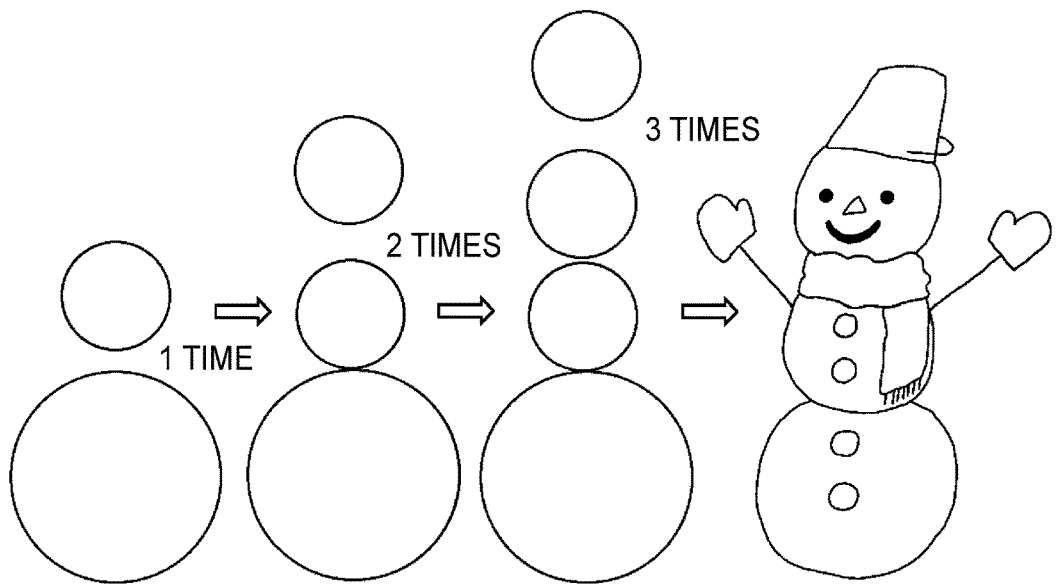
FIG. 13 is a conceptual diagram showing an image of a gift object displayed on a video.
Figure 14:
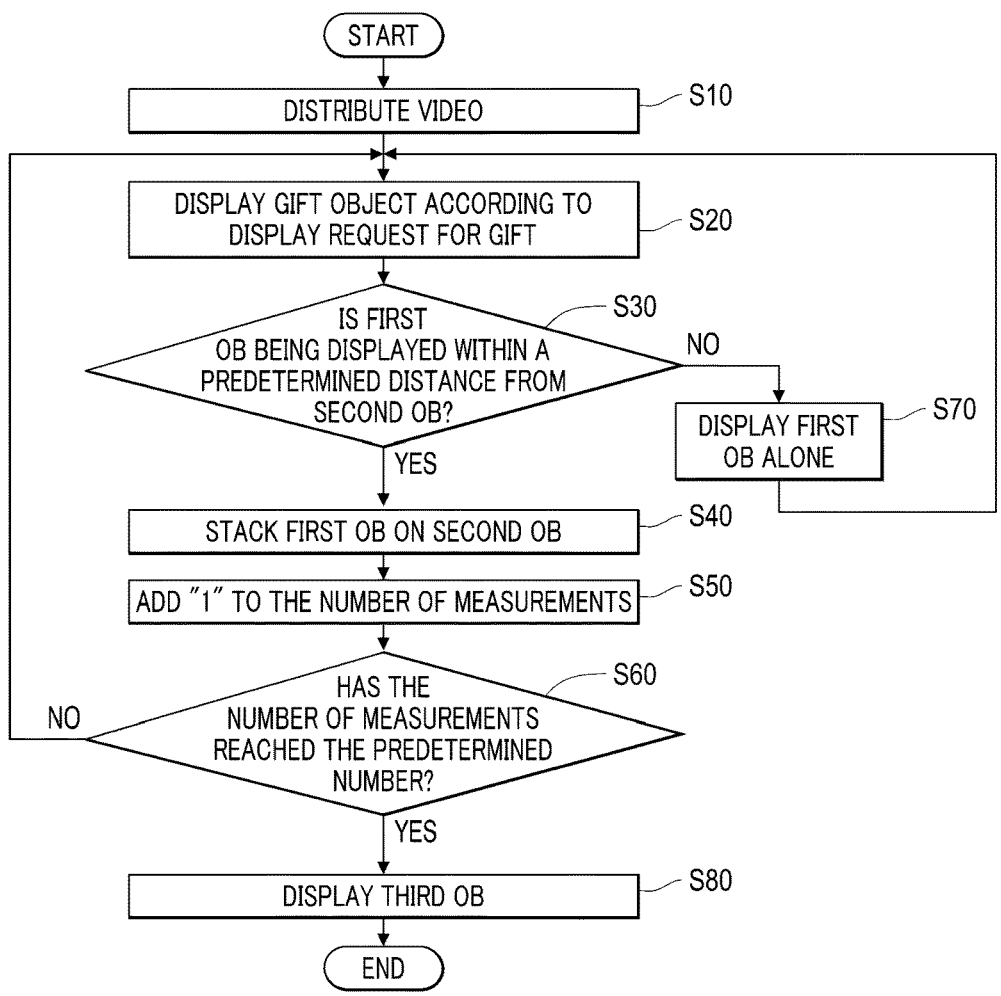
FIG. 14 is a flowchart showing an example of a flow of an information processing method according to this disclosure.

As shown in FIGS. 13 and 14, when the first snowball object (second object) SB2 is displayed by the object display device 420, and the second snowball object (first object) SB1 is displayed (S20), once the determination portion 430 determines that these are within a predetermined distance (Yes in S30), the second snowball object SB1 is displayed in a display mode such that it is stacked on the first snowball object SB2 (S40). Then, the measurement portion 440 updates the number of times of measurement, which is the determined number of times, to one (S50).

Then, the number-of-times determination portion 450 determines that the number of times of measurement (one time) by the measurement portion 440 has not reached the predetermined number of times (three times) (No in S60), and waits for the display of the next snowball object (first object) SB1.

If the determination portion 430 determines in S30 that the snowball object SB2 and the snowball object SB1 are not within the predetermined distance (No in S30), the second snowball object SB1 is not displayed in a display mode such that it is stacked on the first snowball object SB2, but is displayed as a separate snowball object SB1 at another position until the display end timing (S70).

Next, when the third snowball object (first object) SB1 is displayed (S20) at a place in which the first snowball object and the second snowball object SB2 (here, these two are combined to form a second object) are being displayed by the object display device 420, once the determination portion 430 determines that these are within the predetermined distance (Yes in S30), the third snowball object SB1 is displayed in a display mode such that it is stacked on the second snowball object SB2 (S40). The measurement portion 440 updates the number of times of measurement, which is the determined number of times, to two (S50).

Then, the number-of-times determination portion 450 determines that the number of times of measurement (two) by the measurement portion 440 has not reached the predetermined number of times (three) (No in S60), and waits for the display of the next snowball object (first object) SB1.

If the determination portion 430 determines in S30 that they are not within the predetermined distance (No in S30), the third snowball object SB1 is not displayed in a display mode such that it is stacked on the second snowball object SB2, but it is displayed as a separate snowball object SB1 at another position until the display end timing (S70).

Finally, when the fourth snowball object (first object) SB1 is displayed at a place in which the object display device 420 is displaying the first snowball object, the second snowball object, and the third snowball object SB2 (here, the three snowball objects are combined to form the second object) move (S20), once the determination portion 430 determines that these are within the predetermined distance (Yes in S30), the fourth snowball object SB1 is displayed in a display mode such that it is stacked on the third snowball object SB2 (S40). Then, the measurement portion 440 updates the number of times of measurement, which is the determined number of times, to three (S50).

Then, the number-of-times determination portion 450 determines that the number of times of measurement (three) by the measurement portion 440 has reached the predetermined number of times (three) (Yes in S60), and the object display device 420 changes the snowball object SB1 and the snowball object SB2 to a snowman object SM that is the third object, and displays the third object.

If the determination portion 430 determines in S30 that they are not within the predetermined distance (No in S30), the fourth snowball object SB1 is not displayed in a display manner such that it is stacked on the third snowball object SB2, but is displayed as a separate snowball object SB1 at a different position until the display end timing (S70).

In the above examples, the second objects are all the first objects already displayed. However, only the immediately preceding one first object may be the second object.

Further, the predetermined number of times may be three or more, or may be less than three. The following configuration may be used such that particularly the display mode of the first object and the second object may change each time such that if the predetermined number is one, (i) when a second one is stacked on the first one, this creates a small snowman, (ii) when a third one is stacked on the snowman, this creates a medium snowman, and (iii) when a fourth one is stacked on the medium snowman, this creates a large snowman.

In addition, it is possible to express a change gradually from a snowman to a snow monster, and it is also possible to express a change to something conceptually connected, from a dumpling to a rabbit, or from a rabbit to the moon.

In addition, when the third object is displayed, stage effects such as sound effects and smoke may be added.

Further, the object display device 420 can display at least part of the third object so as to cover the head of the character object and follow the movement of the head of the character object.

Figure 15:
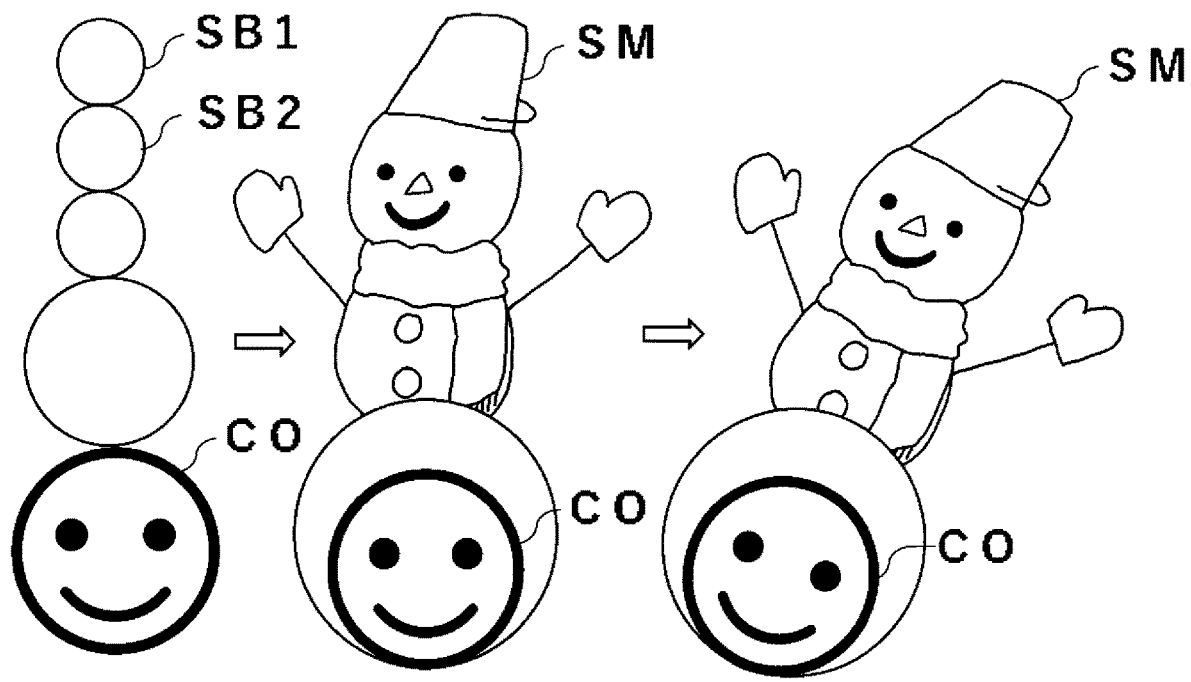
FIG. 15 is a conceptual diagram showing an image of a gift object displayed on a video.

FIG. 15 is a diagram showing an example in which the head of the character object CO is covered at the bottom of the body of the snowman object SM. Additionally, in a state before changing into the snowman object SM, stacked snowball objects are displayed in a state of being stacked on the head of the character object CO. Then, when the head of the character object CO leans to the right, the snowman object SM is displayed so as to lean to the right accordingly.

Additionally, while the third object is being displayed, the object display device 420 preferably restricts the display of a first object based on the further display request for the first gift.

In this case, the display request itself for the first gift by the viewing user is accepted. It is also acceptable that a deadline may be set for a period for which this display is restricted and that display may be performed again, beginning from a first one of the objects, after the predetermined period has passed. At this time, the display request already made stands by as a queue.

Alternatively, one or a plurality of computer processors according to this disclosure may also restrict acceptance of a further display request for the first gift while the third object is being displayed.

In this case, the display request itself for the first gift by the viewing user is not accepted. At this time, the gift list displayed on the viewing user terminal is displayed in such a manner that the first gift for which acceptance of the display request is restricted cannot be selected.

Further, the object display device 420 can display the first object, based on designation of an initial display position of the first object transmitted from the viewing user terminal.

As shown in FIG. 15, the head of the character object CO can be moved based on the movement of the distribution user. However, the viewing user specifies the initial display position of the first object, thereby providing fun such as making it easy to reduce the distance between the first object and the second object, or making it hard to reduce the distance between the first object and the second object, which can activate communication between the distribution user and the viewing user.

In addition, the object display device 420 can display the third object so as to be attached to a predetermined portion of the character object.

That is, the third object functions as an attached gift. Specifically, as shown in FIG. 15, the third object can be attached to the head of the character object. Also, this attaching may be done after obtaining permission of the distribution user.

Alternatively, the object display device 420 can display the third object so as to be arranged in a space (e.g., an empty space) within the video.

That is, the third object functions as a non-attached gift. Specifically, as shown in FIG. 11, the third object is not something that is attached to the character object, but can be arranged at a predetermined position of a virtual space within the video.

In the above mode, an example was explained in which the first object is a snowball object, but the first object may be displayed as an animation in which a plurality of snow lumps or snowflakes fall. At this time, when the reproduction of the animation ends or when the snow lumps or snowflakes contact the character object, the snowman object may be attached to the head of the character object.

Additionally, in the above mode, an example was explained in which the objects displayed in response to the same display request for the first gift gradually change. However, other types of gifts that have characteristics associated with the first gift may also be able to change the object that is being displayed.

Specifically, using the snowman object as an example, after the snowball object is attached to the head of the character object in response to the display request for the snowball gift, a display request for an icicle gift is made. A configuration may be used such that, while icicles are falling from the top of the screen to the bottom, if they touch the snowman object, the snowman object is enlarged. At this time, the icicle gift and the snowball gift are managed in association with each other.

An example of such a management method is a method of applying the same "ice attribute" to the icicle gift and the snowball gift. In addition to the "ice attribute", various attributes such as "sweets attribute", "water attribute", "fire attribute", and "food attribute" can be applied.

According to the above configuration, a technical improvement can be provided that solves or alleviates at least part of the problem of the above-described conventional technology. Specifically, according to a mode of this disclosure, a motivation of the viewing user for gifting can be improved.

According to the above configuration, by making some change(s) to the display of the gift(s), the interest in gifting can be increased. Moreover, the motivation of the viewing user for gifting can be improved.

Next, an information processing method according to a mode of this disclosure will be explained.

An information processing method according to a mode of this disclosure is an information processing method of the video distribution system 2000, as shown in FIG. 2, that distributes a video including an animation of a character object generated based on the movement of the distribution user. The video distribution system 2000 includes the distribution user terminal 100, the viewing user terminals 200, and the information processor 400 (server device 400).

Figure 16:
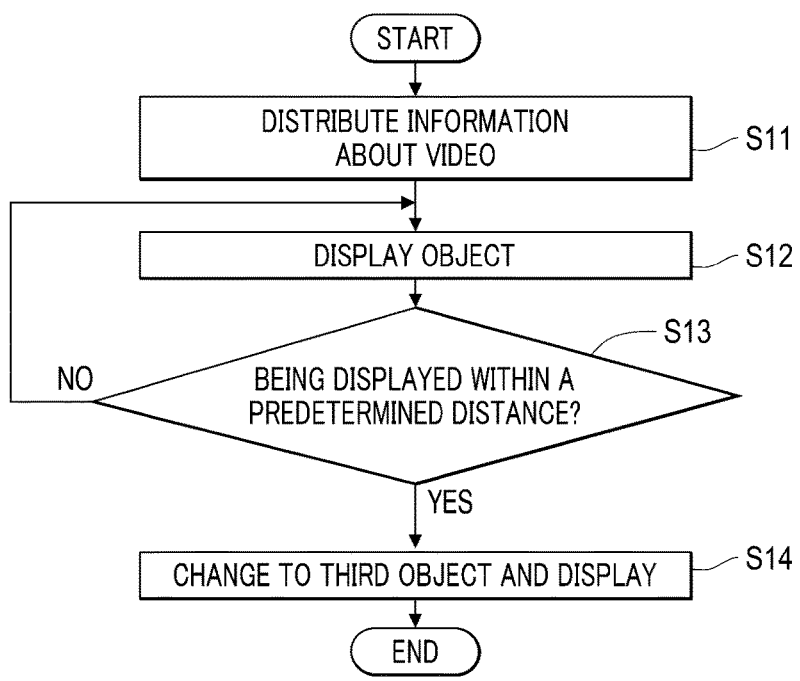
FIG. 16 is a flowchart showing an example of a flow of an information processing method according to this disclosure.

As shown as an example in FIG. 16, an information processing method according to this disclosure causes one or a plurality of processors included in the video distribution system to execute a distributing step S11, an object display step S12, and a determining step S13.

In the distributing step S11, information about the video, including an animation of the character object of the distribution user, is distributed to a viewing user terminal. The distributing step S11 can be executed by the above-described distribution portion 410.

In the object display step S12, the first object corresponding to the first gift is displayed on the video, based on the display request for the first gift transmitted from the viewing user terminal. The object display step S12 can be executed by the above-described object display device 420.

In the determining step S13, it is determined whether the first object displayed in the object display step is being displayed within a predetermined distance from a second object already displayed on the video. The determining step S13 can be executed by the above-described determination portion 430.

Further, if the determining step S13 determines that the first object is displayed within the predetermined distance from the second object (Yes in S13), the first object and the second object are changed to a third object, and then the third object is displayed (S14). Step S14 can be executed by the above-described object display device 420.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Next, a computer program according to a mode of this disclosure will be described.

A computer program according to a mode of this disclosure is a computer program that is executed by the video distribution system 2000, as shown in FIG. 2, that distributes a video including an animation of a character object generated based on the movement of a distribution user. The video distribution system 2000 includes the distribution user terminal 100, the viewing user terminals 200, and the information processor 400 (server device 400).

The computer program according to this disclosure causes one or a plurality of processors included in the video distribution system to realize a distribution function, an object display function, and a determination function.

The distribution function distributes information about the video including the animation of the character object of the distribution user to the viewing user terminals.

The object display function displays on the video the first object corresponding to the first gift, based on a display request for a first gift transmitted from a viewing user terminal.

The determination function determines whether the first object displayed in the object display function is being displayed within a predetermined distance from a second object already displayed on the video.

When the determination function determines that the first object is being displayed within a predetermined distance from the second object, the object display function changes the first object and the second object to a third object and displays the third object.

Figure 17:
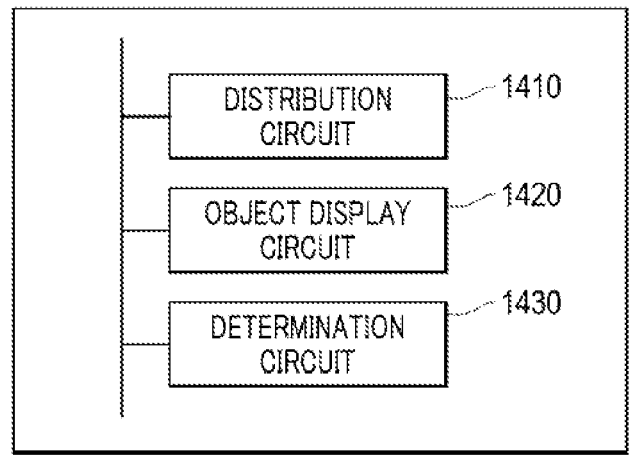
FIG. 17 is a circuit configuration diagram showing an example of a circuit configuration for realizing a computer program according to this disclosure.

The above-described functions can be realized by a distribution circuit 1410, an object display circuit 1420, and a determination circuit 1430 that are shown in FIG. 17. The distribution circuit 1410, the object display circuit 1420, and the determination circuit 1430 are respectively realized by the above-described distribution portion 410, object display device 420, and determination portion 430. The details of each component are as described above.

According to the above configuration, a technical improvement can be provided that solves or alleviates at least part of problems of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Next, a distribution user terminal according to a mode of this disclosure will be explained.

A distribution user terminal according to this disclosure includes the video distribution system 2000, as shown in FIG. 2, that distributes a video including an animation of a character object that is generated based on the movement of a distribution user. The video distribution system 2000 further includes the viewing user terminals 200 and the information processor 400 (server device 400).

Figure 18A:
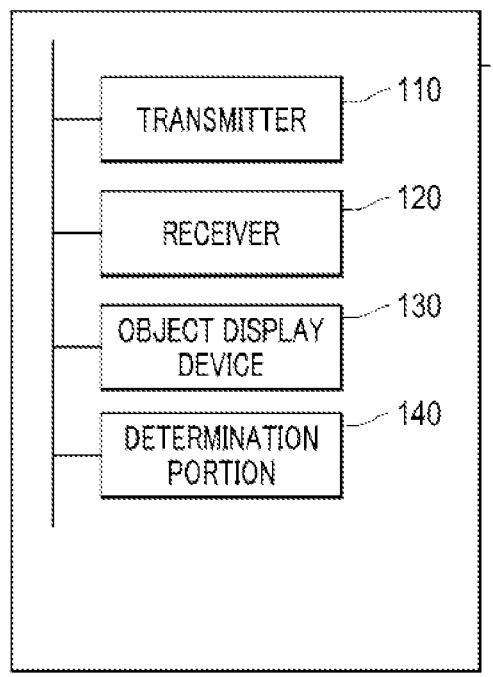
FIG. 18A is a configuration diagram illustrating an example of a functional configuration of a distribution user terminal according to this disclosure.

Also, as shown in FIG. 18A, the distribution user terminal 100 includes a transmitter 110, a receiver 120, an object display device 130, and a determination portion 140.

The transmitter 110 transmits, to the server device 400, information about the video including the animation of the character object of the distribution user.

The receiver 120 receives, from the server device 400, a display request, by a viewing user terminal 200, for a first gift displayed on the video.

The object display device 130 causes a first object corresponding to the first gift to be displayed on the video, based on the display request received by the receiver 120. The object display device 130 may have the same functional configuration as the object display device 420 included in the above-described information processor 400.

The determination portion 140 determines whether the first object displayed by the object display device 130 is being displayed within a predetermined distance from a second object already displayed on the video. The determination portion 140 may have the same functional configuration as the determination portion 430 included in the above-described information processor 400.

Then, when the determination portion 140 determines that the first object is displayed within the predetermined distance from the second object, the object display device 130 changes the first object and the second object to a third object and displays the third object.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a computer program for a distribution user terminal according to a mode of this disclosure will be explained.

A computer program according to this disclosure is a computer program executed by the distribution user terminal 100 that constitutes a video distribution system, as shown in FIG. 2, that distributes a video including an animation of a character object generated based on a movement of a distribution user. The video distribution system 2000 further includes the viewing user terminals 200 and the information processor 400 (server device 400).

Also, the computer program causes one or a plurality of computer processors included in the distribution user terminal to realize a transmission function, a reception function, an object display function, and a determination function.

The transmission function transmits, to the server device 400, information about the video including the animation of the character object of the distribution user.

The reception function receives, from the server device 400, a display request, by a viewing user terminal 200, for a first gift displayed on the video.

The object display function causes the first object corresponding to the first gift to be displayed on the video, based on the display request received by the reception function. The object display function may have the same functional configuration as the object display function realized by the above-described information processor 400.

The determination function determines whether the first object displayed by the object display function is being displayed within a predetermined distance from a second object already displayed on the video. The determination function may have the same functional configuration as the determination function realized by the above-described information processor 400.

Then, when the determination function determines that the first object is displayed within the predetermined distance from the second object, the object display function changes the first object and the second object to a third object and displays the third object.

Figure 18B:
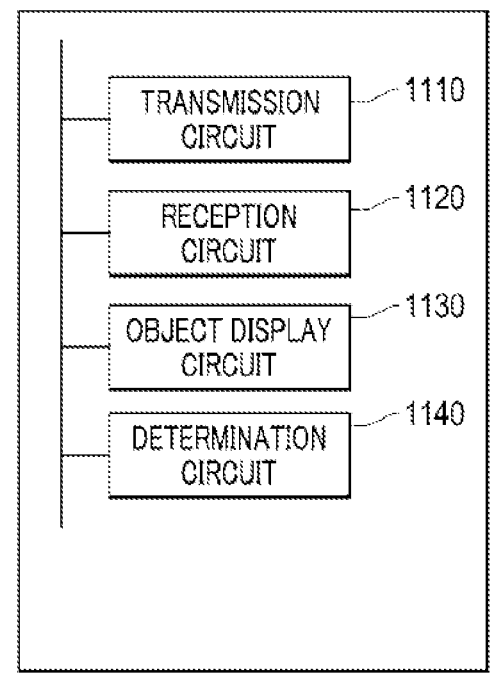
FIG. 18B is a configuration diagram showing an example of a circuit configuration for realizing a function of a program for a distribution user terminal according to this disclosure.

The above-described functions can be realized by a transmission circuit 1110, a reception circuit 1120, an object display circuit 1130, and a determination circuit 1140 as shown in FIG. 18B. The transmission circuit 1110, the reception circuit 1120, the object display circuit 1130, and the determination circuit 1140 are respectively realized by the transmitter 110, the receiver 120, the object display device 130, and the determination portion 140 that are described above. The details of each component are as described above.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, an information processing method in a distribution user terminal according to a mode of this disclosure will be explained.

An information processing method according to this disclosure is an information processing method using a distribution user terminal that includes a video distribution system, as shown in FIG. 2, that distributes a video including an animation of a character object generated based on a movement of a distribution user. The video distribution system 2000 further includes the viewing user terminals 200 and the information processor 400 (server device 400).

Figure 19:
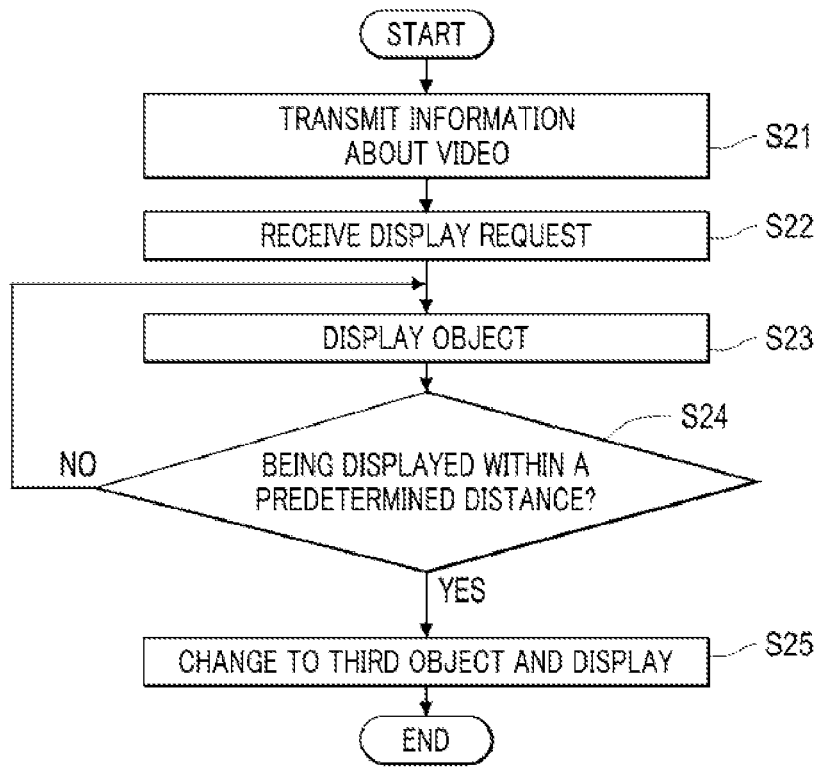
FIG. 19 is a flowchart showing an example of a flow of an information processing method of a distribution user terminal according to this disclosure.

As shown in FIG. 19 as an example, an information processing method according to this disclosure causes one or a plurality of computer processors included in the distribution user terminal to execute a transmitting step S21, a receiving step S22, object display steps S23 and S25, and a determining step S24.

In the transmitting step S21, information about the video including the animation of the character object of the distribution user is transmitted to the server device 400. The transmitting step S21 can be executed by the above-described transmitter 110.

In the receiving step S22, a display request, by a viewing user terminal 200, for a first gift displayed on the video is received from the server device 400. The receiving step S22 can be executed by the above-described receiver 120.

In the object display step S23, a first object corresponding to the first gift is displayed on the video, based on the display request received in the receiving step S22. The object display step S23 can be executed by the above-described object display device 130.

In the determining step S24, it is determined whether the first object displayed in the object display step S23 is being displayed within a predetermined distance from a second object already displayed on the video. The determining step S24 can be executed by the above-described determination portion 140.

Then, in the determining step S24, when it is determined that the first object is being displayed within a predetermined distance from the second object (Yes in S24), the first object and the second object are changed to a third object, and then the third object is displayed (S25). The above-described step S24 can be executed by the above-described object display device 130.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a viewing user terminal according to a mode of this disclosure will be explained.

A viewing user terminal according to this disclosure includes the video distribution system 2000, as shown in FIG. 2, that distributes a video including an animation of a character object that is generated based on a movement of a distribution user. The video distribution system 2000 further includes the distribution user terminal 100 and the information processor 400 (server device 400).

Figure 20A:
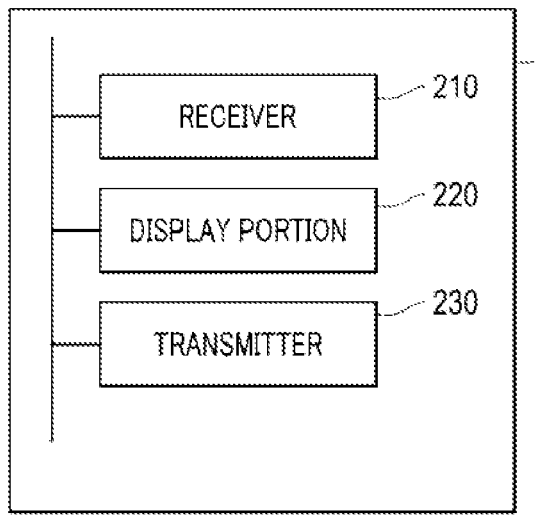
FIG. 20A is a configuration diagram showing an example of a functional configuration of a viewing user terminal according to this disclosure.

In addition, as shown in FIG. 20A, the viewing user terminal 200 includes a receiver 210, a display device 220, and a transmitter 230.

The receiver 210 receives, from the server device 400, information about the video including the animation of the character object of the distribution user.

The display device 220 displays the video, based on the information about the video.

The transmitter 230 transmits, to the server device, a display request for a first gift displayed on the video.

Then, it is determined whether a first object displayed on the video based on the display request is being displayed within a predetermined distance from a second object already displayed on the video. As a result, when it is determined that the first object is displayed within the predetermined distance from the second object, the display device 220 changes the first object and the second object to a third object and displays the third object.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, a computer program for a viewing user terminal according to a mode of this disclosure will be explained.

A computer program according to this disclosure is a computer program executed by a viewing user terminal 200 that includes the video distribution system 2000, as shown in FIG. 2, that distributes a video including an animation of a character object that is generated based on a movement of a distribution user. The video distribution system 2000 further includes the distribution user terminal 100 and the information processor 400 (server device 400).

Also, the computer program has a reception function, a display function, and a transmission function in one or a plurality of computer processors included in the viewing user terminal.

The reception function receives, from the server device 400, information about the video included in the animation of the character object of the distribution user.

The display function displays the video, based on the information about the video.

The transmission function transmits, to the server device, a display request for the first gift displayed on the video.

Then, it is determined whether a first object displayed on the video based on the display request is being displayed within a predetermined distance from a second object already displayed on the video. As a result, when it is determined that the first object is being displayed within the predetermined distance from the second object, the display function changes the first object and the second object to a third object and displays the third object. Also, whether the first object displayed on the video based on the display request is being displayed within a predetermined distance from the second object already displayed on the video may be determined by either the viewing user terminal or the server device.

Figure 20B:
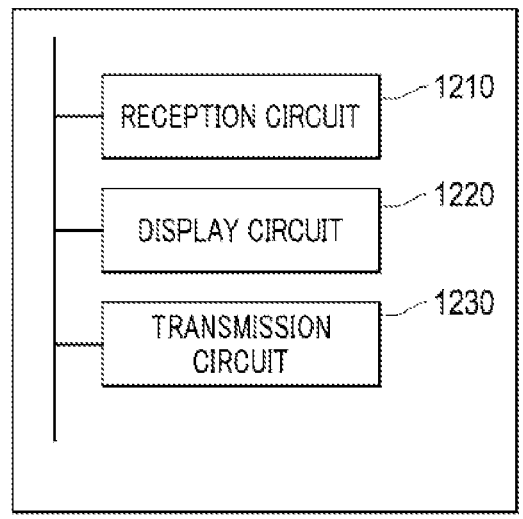
FIG. 20B is a configuration diagram showing an example of a circuit configuration for realizing a function of a program for a viewing user terminal according to this disclosure.

The above functions can be realized by a receiving circuit 1210, a display circuit 1220, and a transmission circuit 1230 that are shown in FIG. 20B. The reception circuit 1210, the display circuit 1220, and the transmission circuit 1230 are realized by the receiver 210, the display device 220, and the transmitter 230 described above, respectively. The details of each component are as described above.

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

Subsequently, an information processing method for the viewing user terminal(s) according to a mode of this disclosure will be explained.

An information processing method according to this disclosure is an information processing method for a viewing user terminal that includes a video distribution system, as shown in FIG. 2, that distributes a video including an animation of a character object that is generated based on a movement of a distribution user. The video distribution system 2000 further includes the distribution user terminal 100 and the information processor 400 (server device 400).

Figure 21:
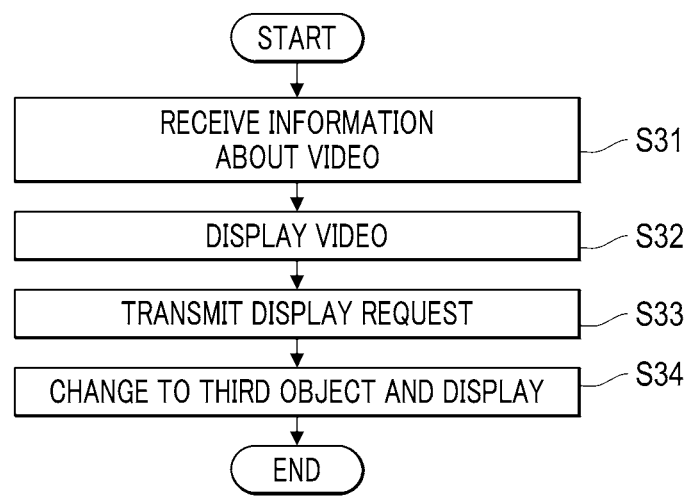
FIG. 21 is a flowchart showing an example of a flow of an information processing method in a viewing user terminal according to this disclosure.

As shown in FIG. 21, an information processing method according to this disclosure causes one or a plurality of computer processors included in the viewing user terminal to execute a receiving step S31, display steps S32, S34, and a transmitting step S33.

In the receiving step S31, information about the video including the animation of the character object of the distribution user is received from the server device. The receiving step S31 can be executed by the above-described receiver 210.

In the display step S32, the video is displayed, based on the information about the video. The display step S32 can be executed by the above-described display device 220.

In the transmitting step S33, a display request for a first gift displayed on the video is transmitted to the server device. The transmitting step S33 can be executed by the above-described transmitter 230.

Then, it is determined whether a first object displayed on the video based on the display request is being displayed within a predetermined distance from a second object already displayed on the video. As a result, when it is determined that the first object is displayed within the predetermined distance from the second object, the first object and the second object are changed to a third object, and then the third object is displayed (S34).

According to the above configuration, a technical improvement can be provided that solves or alleviates at least part of the problem of the above-described conventional technology. Specifically, according to a mode of this disclosure, a motivation of the viewing user for gifting can be improved.

Further, according to the above configuration, by making some change(s) to the display of the gift(s), the interest of gifting can be enhanced, and the motivation of the viewing user for gifting can be improved.

In addition, an information processor such as a computer or a mobile phone can be preferably used in order to be caused to function as the server device or a terminal device according to the above-described modes. Such an information processor can be realized by (i) storing, in a memory of the information processor, a program describing processing contents for realizing each function of the server device or a terminal device according to the modes, and (ii) reading and executing the program by the CPU of the information processor.

Although some modes of this disclosure have been explained, these modes are presented as examples. Therefore, they are not intended to limit the scope of the disclosure. These novel modes can be implemented in various other forms. Various omissions, replacements, and changes can be made without departing from the gist of the disclosure. These modes and their modifications are included in the scope and gist of the disclosure, and are also included in the disclosure described in the scope of claims and the scope of equivalents thereof.

Furthermore, the methods described in the modes can also be stored in a recording medium, for example, a magnetic disk (a floppy (registered trademark) disk, a hard disk, or the like), an optical disk (a CD-ROM, a DVD, an MO, or the like), a semiconductor memory (a ROM, a RAM, a flash memory, or the like), as programs that can be executed by a computer, and can be transmitted by a communication medium for distribution. The programs stored on the medium side also include a setting program that constitutes, in the computer, software means (including not only an execution program, but also tables and data structures) to be executed by the computer. The computer that realizes this device reads a program recorded in a recording medium. In some cases, it executes the above-described processes by constituting software means by a setting program, and having operations controlled by this software means. The recording medium referred to in this specification is not limited to distribution, but includes a recording medium such as a magnetic disk or a semiconductor memory or the like provided in a device inside a computer or connected via a network. The memory may function as, for example, a main memory device, an auxiliary memory device, or a cache memory.

[Notes]

The disclosure described in the scope of the claims in the as-filed application of this application is added below.

[1]

A video distribution system that distributes a video including an animation of a character object generated based on a movement of a distribution user, and comprises one or a plurality of computer processors, the one or plurality of computer processors comprising:

a distribution portion that distributes, to a viewing user terminal, information about a video including the animation of the character object of the distribution user, an object display device that displays a first object corresponding to a first gift on the video based on a display request for the first gift transmitted from the viewing user terminal, and a determination portion that determines whether the first object displayed by the object display device is being displayed within a predetermined distance from a second object already displayed on the video, wherein:

when the determination portion determines that the first object is being displayed within a predetermined distance from the second object, the object display device changes the first object and the second object to a third object and displays the third object.

[2]

The video distribution system according to the above [1], wherein:

while the third object is being displayed, the object display device restricts the display of a first object based on the further display request for the first gift.

[3]

The video distribution system according to the above [1] or [2], wherein:

while the third object is being displayed, the one or plurality of computer processors restrict acceptance of a further display request for the first gift.

[4]

The video distribution system according to any of the above [1]-[3], wherein:

the one or plurality of computer processors further comprises:

a measurement portion that, in connection with the plurality of first objects, measures the number of times it is determined that the objects are being displayed within a predetermined distance from one or a plurality of second objects already displayed on the video when a plurality of first objects are displayed by the object display device, and a number-of-times determination portion that determines whether the number of times measured by the measurement portion has reached a predetermined number, and when the number-of-times determination portion determines that the number of times has reached the predetermined number, the object display device changes the first objects and the second objects to a third object and displays the third object.

[5]

The video distribution system according to the above [4], wherein:

the object display device displays at least part of the third object so as to cover a head of the character object and follow the movement of the head of the character object.

[6]

The video distribution system according to the above [4] or [5], wherein:

the one or plurality of computer processors changes the predetermined number of times, based on a screen size of the video.

[7]

The video distribution system according to any of the above [4]-[6], wherein:

when the number-of-times determination portion determines that the number of times has not reached the predetermined number of times, the object display device displays the first object in contact with the second object.

[8]

The video distribution system according to any of the above [1]-[7], wherein:

the object display device displays the first object, based on designation of an initial display position of the first object transmitted from the viewing user terminal.

[9]

The video distribution system according to any of the above [1]-[8], wherein:

the object display device displays the third object so as to be attached to a predetermined portion of the character object.

The video distribution system according to any of the above [1]-[4], wherein:

the object display device displays the third object so as to be arranged in a space within the video.

An information processing method in a video distribution system that distributes a video including an animation of a character object that is generated based on a movement of a distribution user and causes one or a plurality of computer processors included in the video distribution system to execute:

a distributing step that distributes, to a viewing user terminal, information about a video including an animation of a character object of the distribution user, an object display step that displays a first object corresponding to a first gift on the video based on a display request for the first gift transmitted from the viewing user terminal, and a determining step that determines whether the first object displayed in the object display step is being displayed within a predetermined distance from the second object already displayed on the video; and if the determining step determines that the first object is displayed within the predetermined distance from the second object, the first object and the second object are changed to a third object, and then the third object is displayed.

A computer program executed by a distribution user terminal that includes a video distribution system that distributes a video including an animation of a character object that is generated based on a movement of a distribution user, the video distribution system including the distribution user terminal, a viewing user terminal, and a server device and causes one or a plurality of computer processors included in the distribution user terminal to realize:

a transmission function that transmits, to the server device, information about the video including the animation of the character object of the distribution user, a reception function that receives, from the server device, a display request, by the viewing user terminal, for a first gift to be displayed on the video, an object display function that displays a first object corresponding to the first gift on the video, based on the display request received from the reception function, and a determination function that determines whether the first object displayed by the object display function is being displayed within a predetermined distance from a second object already displayed on the video; wherein:

if the determination function determines that a first object is being displayed within a predetermined distance from a second object, the object display function changes the first object and the second object to a third object and displays the third object.

An information processing method in a distribution user terminal that includes a video distribution system that distributes a video including an animation of a character object that is generated based on a movement of a distribution user, the video distribution system including the distribution user terminal, a viewing user terminal, and a server device and causing one or a plurality of computer processors included in the distribution user terminal to execute:

a transmitting step that transmits, to the server device, information about the video including the animation of the character object of the distribution user, a receiving step that receives, from the server device, a display request, by the viewing user terminal, for a first gift to be displayed on the video, an object display step that displays a first object corresponding to the first gift on the video, based on the display request received by the receiving step, and a determining step that determines whether the first object displayed in the object display step is being displayed within a predetermined distance from a second object already displayed on the video, wherein:

if the determining step determines that the first object is being displayed within a predetermined distance from the second object, in the object display step, the first object and the second object are changed to a third object, and then the third object is displayed.

A computer program executed by a viewing user terminal that includes a video distribution system that distributes a video including an animation of a character object that is generated based on a movement of a distribution user, the video distribution system including a distribution user terminal, the viewing user terminal, and a server device and causing one or a plurality of computer processors included in the viewing user terminal to realize:

a reception function that receives, from the server device, information about the video including the animation of the character object of the distribution user, a display function that displays the video, based on the information about the video, and a transmission function that transmits, to the server device, a display request for a first gift to be displayed on the video, wherein:

according to a result of determining whether a first object displayed on the video based on the display request is being displayed within a predetermined distance from a second object already displayed on the video, if it is determined that the first object is being displayed within a predetermined distance from the second object, the display function changes the first object and the second object to a third object and displays the third object.

An information processing method in a viewing user terminal that includes a video distribution system that distributes a video including an animation of a character object that is generated based on a movement of a distribution user, the video distribution system including a distribution user terminal, the viewing user terminal, and a server device and causing one or a plurality of computer processors included in the viewing user terminal to execute:

a receiving step that receives, from the server device, information about the video including the animation of the character object of the distribution user, a display step that displays the video, based on the information about the video, and a transmitting step that transmits, to the server device, a display request for a first gift to be displayed on the video, wherein:

as a result of determining whether a first object displayed on the video based on the display request is being displayed within a predetermined distance from a second object already displayed on the video, if it is determined that the first object is being displayed within a predetermined distance from the second object, the display step changes the first object and the second object to a third object and displays the third object.

EXPLANATION OF SYMBOLS

1000 Video distribution system
2000 Video distribution system
100 Distribution user terminal
200 Viewing user terminal
300 Network
400 Information processor
410 Distribution portion
420 Object display device
430 Determination portion

The invention claimed is:

1. A video distribution system that distributes a video including an animation of a character object, and comprises one or a plurality of computer processors, the one or plurality of computer processors being programmed to:

distribute, to a viewing user terminal, information about the video including the animation of the character object of a distribution user;

display a first object corresponding to a first gift on the video based on a display request for the first gift transmitted from the viewing user terminal;

make a determination of whether the first object displayed is being displayed within a predetermined distance from the character object or whether the first object is being displayed in contact with the character object; and based on the determination, change the first object to a third object displayed as attached to the character object, wherein the animation of the character object of the distribution user is generated using at least face motion data of the distribution user captured using a camera.

2. The video distribution system according to claim 1, wherein the one or plurality of computer processors display at least a part of the first object or of the third object so as to follow movement of the character object.

3. The video distribution system according to claim 2, wherein the one or plurality of computer processors display at least the part of the third object so as to cover a head of the character object and follow movement of the head of the character object.

4. The video distribution system according to claim 1, wherein
whether the first object is being displayed within the predetermined distance from the character object or whether the first object is being displayed in contact with the character object is determined by comparing (i) three-dimensional or two-dimensional coordinates of a position at which the first object is being displayed and (ii) three-dimensional or two-dimensional coordinates of a position at which the character object is being displayed.

5. The video distribution system according to claim 1, wherein
the one or plurality of computer processors further determine whether the first object has an attribute associated with the character object.

6. The video distribution system according to claim 1, wherein
a plurality of the first objects are displayed according to the display request.

7. The video distribution system according to claim 1, wherein
while the third object is being displayed, the one or plurality of computer processors restrict the display of the first object based on the further display request for the first gift.

8. The video distribution system according to claim 1, wherein
while the third object is being displayed, the one or plurality of computer processors restrict acceptance of a further display request for the first gift.

9. The video distribution system according to claim 1, wherein
the one or plurality of computer processors display the first object based on designation of an initial display position of the first object transmitted from the viewing user terminal.

10. The video distribution system according to claim 1, wherein
the first object is displayed as an animation.

11. An information processing method by one or a plurality of computer processors included in a video distribution system that distributes a video including an animation of a character object, the method comprising:

distributing, to a viewing user terminal, information about the video including the animation of the character object of a distribution user;

displaying a first object corresponding to a first gift on the video based on a display request for the first gift transmitted from the viewing user terminal;

making a determination of whether the first object displayed is being displayed within a predetermined distance from the character object or whether the first object is being displayed in contact with the character object; and based on the determination, changing the first object to a third object displayed as attached to the character object, wherein the animation of the character object of the distribution user is generated using at least face motion data of the distribution user captured using a camera.

12. A non-transitory computer-readable medium storing a computer program executed by a distribution user terminal included in a video distribution system that distributes a video including an animation of a character object, the video distribution system including the distribution user terminal, a viewing user terminal, and a server device, the program causing one or a plurality of computer processors included in the distribution user terminal to execute:

transmitting, to the server device, information about the video including the animation of the character object of a distribution user;

receiving, from the server device, a display request, by the viewing user terminal, for a first gift to be displayed on the video;

displaying a first object corresponding to the first gift on the video, based on the display request received;

making a determination of whether the first object displayed is being displayed within a predetermined distance from the character object or whether the first object is being displayed in contact with the character object; and based on the determination, changing the first object to a third object displayed as attached to the character object, wherein the animation of the character object of the distribution user is generated using at least face motion data of the distribution user captured using a camera.

* * * * *